United States Patent [19]
Adedeji

[11] Patent Number: 6,113,822
[45] Date of Patent: Sep. 5, 2000

[54] POLYOLEFINS AS NUCLEATING AGENT FOR FOAMED ENGINEERING POLYMERS

[75] Inventor: Adeyinka Adedeji, Albany, N.Y.

[73] Assignee: General Electric Company, Pittsfield, Mass.

[21] Appl. No.: 09/220,565

[22] Filed: Dec. 23, 1998

[51] Int. Cl.$^7$ ................................ C08J 9/00; B29B 7/00
[52] U.S. Cl. .................... 264/48; 264/328.1; 264/328.4; 521/79; 521/81; 521/134; 521/138; 521/139
[58] Field of Search ............................ 521/79, 81, 134, 521/139, 138; 264/48, 328.1, 328.14

[56] References Cited

U.S. PATENT DOCUMENTS

| | | |
|---|---|---|
| 4,166,055 | 8/1979 | Lee, Jr. . |
| 4,228,046 | 10/1980 | Lee, Jr. . |
| 4,239,673 | 12/1980 | Lee, Jr. . |
| 4,242,263 | 12/1980 | Lee, Jr. . |
| 4,315,084 | 2/1982 | Cooper et al. . |
| 4,332,714 | 6/1982 | Haaf et al. . |
| 4,383,082 | 5/1983 | Lee, Jr. . |
| 4,410,651 | 10/1983 | Haaf et al. . |
| 4,535,106 | 8/1985 | Abolins et al. . |
| 4,584,334 | 4/1986 | Lee, Jr. et al. . |
| 5,314,925 | 5/1994 | Burnell et al. . |
| 5,411,687 | 5/1995 | Imeokparia et al. ...................... 521/79 |
| 5,434,195 | 7/1995 | Imeokparia et al. ...................... 521/79 |
| 5,618,853 | 4/1997 | Vonken et al. ............................ 521/79 |
| 5,650,106 | 7/1997 | Paquet et al. ............................. 521/79 |
| 5,693,687 | 12/1997 | Imeokparia et al. ...................... 521/79 |
| 5,824,710 | 10/1998 | Imeokparia et al. ...................... 521/79 |

Primary Examiner—Morton Foelak

[57] ABSTRACT

A process for producing structural thermoplastic foam is provided which involves gas expansion of a melted thermoplastic resin composition containing an amount of a polyolefin resin effective as a nucleating agent. The thermoplastic resin compositions provided exhibit an improved uniformity of cell structure in the resultant structural thermoplastic foam as a result of the incorporation of the polyolefin nucleating agent. The process and compositions are useful in the production of structural thermoplastic foam articles.

11 Claims, No Drawings

POLYOLEFINS AS NUCLEATING AGENT FOR FOAMED ENGINEERING POLYMERS

CROSS-REFERENCE TO RELATED APPLICATIONS

Not Applicable.

FEDERALLY SPONSORED RESEARCH

Not Applicable.

BACKGROUND OF THE INVENTION

1. Field of the Invention

This invention relates to a novel method for nucleating engineering thermoplastic resins utilizing a polyolefin resin as a nucleating agent. In several preferred embodiments of the invention, polyethylene is used as a nucleating agents for blends of poly(phenylene ether) resins with polystyrene resins, for polycarbonate resins, and for blends of polycarbonate resins with rubber modified vinyl aromatic graft copolymers.

2. Brief Description of the Related Art

The production of thermoplastic structural foam articles by injection molding processes using either an inert gas such as nitrogen, a chemical blowing agent, or mixtures thereof, are well known in the art. Such processes typically use a thermoplastic resin which contains an amount of a nucleating agent which is added for the purpose of assisting in the formation of cell structures during the foaming process. The use of some nucleating agents such as clay have, however, in some circumstances can show an inability to uniformly expand the thermoplastic resins resulting in non-uniform cell structures and higher density foams than are desired.

Fluoropolymers, such as poly(tetrafluoroethylene) resins, have been described as nucleating agents for various engineering resins. The fluoropolymers are expensive and often create difficulties in handling such as poor powder flow during compounding of chemical blowing agent concentrate, the population of cell is predetermined by the poly(tetrafluoroethylene) population.

Accordingly, there continues to be a need for a nucleating agent which will enhance the uniformity of the cell structures formed upon expansion of the resin.

SUMMARY OF THE INVENTION

The instant invention is directed towards a process for producing structural thermoplastic foam which involves gas expansion of a melted thermoplastic resin composition comprising at least one foamable thermoplastic resin and an amount of polyolefin resin effective as a nucleating agent. The use of polyolefin nucleating agent provides a structural thermoplastic foam that exhibits improved cell uniformity, lower foam density, and requires lower loadings of nucleating agent than has traditionally been the case for nucleating agents such as clay. Moreover, handling difficulties associated with PTFE are avoided.

DESCRIPTION OF THE DRAWINGS

Not applicable.

DETAILED DESCRIPTION OF THE INVENTION

The process of the present invention involves gas expansion of a melted thermoplastic resin composition comprising at least one foamable thermoplastic resin and an amount of a polyolefin resin effective as a nucleating agent. The nucleating agent is preferably present at a level effective to enhance the cell structure uniformity of the structural foam.

The polyolefin nucleating agent for the present invention is a non-elastomeric polyolefin resin effective for nucleating thermoplastic resins.

The non-elastomeric polyolefin resins which can be used in the present invention include homopolymers of an α-olefin having a straight or branched chain or alicyclic structure such as ethylene, propylene, butene-1, pentene-1, hexene-1, 3-methylbutene-1, 4-methylpentene-1, heptene-1, octene-1, vinylcyclohexane, vinylcyclopentane, etc.; random, block, graft or other copolymers of two or more comonomers selected from among these (α-olefins; random, block, graft or other copolymers comprising at least one of the above-described α-olefins as a major component and at least one of other unsaturated comonomers; and oxidation, halogenation or sulfonation products of these polymers. These polyolefinic resins show crystallinity at least partly.

The polyolefinic resin is typically a copolymer made from at least 65% ethylene monomer with at least one olefinic monomer of the following structure (I):

wherein $R_1$ is selected from the group consisting of a $C_{1-10}$ alkylene radical and a radical of the following structure (II):

wherein $R_2$ is selected from the group consisting of a $C_{1-10}$ alkylene radical, a $C_{6-10}$ alicyclic radical, and a $C_{6-20}$ aromatic radical.

Examples of the aforesaid unsaturated comonomers include unsaturated organic acids or derivatives thereof, e.g., acrylic acid, methacrylic acid, maleic acid, itaconic acid, methyl acrylate, ethyl acrylate, methyl methacrylate, butyl acrylate, maleic anhydride, an arylmaleicimide, and alkylmaleicimide, etc.; vinyl esters, e.g., vinyl acetate, vinyl butyrate, etc.; aromatic vinyl compounds, e.g., styrene, methylstyrene, etc.; vinylsilanes, e.g., vinyltrimethylmethoxysilane, γ-methacryloyloxypropyltrimethoxysilane, etc.; and non-conjugated dienes, e.g., dicyclopentadiene, 4-ethylidene-2-norbornene, 4-methyl-1,4-hexadiene, 5-methyl-1,4-hexadiene, etc.

The polyolefinic resins can be prepared by polymerization or modification according to known processes. Any of the commercially available polyolefinic resins may be utilized. These polyolefinic based resins may be used either individually or in combinations thereof. Preferred among them are homopolymers of ethylene and copolymers comprising at least one of the α-olefins and are referred to in the present specification by the term polyethylene resins.

The polyethylene resins may be obtained from those having lower molecular weight or higher molecular weight by inducing a molecular weight change through a known manner, for example, heat treatment in the presence or absence of a radical generator (e.g., organic or inorganic peroxides, organic tin compounds, organic azo compounds, etc.), heating or mechanical shearing during melt-kneading, or the like technique.

Preferred non-elastomeric polyethylene resins for the present invention include low density polyethylene (LDPE), linear low density polyethylene (LLDPE), high density polyethylene (HDPE), medium density polyethylene (MDPE), as well as copolymers of ethylene and organic esters such as, for example, polyethylene methyl acrylate (EMA) and polyethylene ethyl acrylate (EEA). The resulting final properties of the final composition will vary depending upon the particular polyolefin utilized. These preferred non-elastomeric polyethylene resins are commercially available from Union Carbide as LLDPE and include grades GR7047 and GR8320 and also under the trademark FLEXOMER® and include DFDA 1137, DFDA 1138, DEFD 9042, and GERS 1085. Polyethylene methyl acrylate is commercially available from Chevron Oil Company as PE2205, which contains about 18% by weight methyl acrylate.

The polyolefin resin is generally present in an amount from about 0.1% to about 5% by weight based on the total weight of the composition. The preferred range is about 0.1% to about 2% and is most preferable in the range of about 0.5% to about 1.5% by weight based on the total weight of the entire composition, including any additives.

Suitable engineering thermoplastic resins for use in the invention include aromatic polycarbonate resins, blends of aromatic polycarbonate resins with rubber modified vinyl aromatic graft copolymers, preferably acrylonitrile-butadiene-styrene graft copolymers (ABS), and blends of poly(phenylene ether) resins with polystyrene resins. Preferred engineering thermoplastic resins for use in the invention include blends of poly(phenylene ether) resins with rubber modified polystyrene resins, also known as HIPS, and blends of aromatic polycarbonate resins with ABS.

The polycarbonate resins usefully employed according to the present invention are those previously known and described in the prior art. In general, the polycarbonate resins can be prepared from one or more hylogen-free multihydric compounds by reacting the multihydric compounds such as a diphenol, with a carbonate precursor such as phosgene, a haloformate or a carbonate ester such as diphenyl or dimethyl carbonate. The preferred diphenol is 2,2-bis(4-hydroxyphenyl) propane (also referred to as bisphenol A). Generally speaking, such polycarbonate polymers may be typified as possessing recurring structural units of the formula: —(—O—A—O—C(=O)—)$_n$—, wherein A is a divalent aromatic radical of a dihydric phenol or halogen or alkyl substituted phenol at both the 3 and 5 position employed in the polymer producing reaction. Preferably, the carbonate polymers used in this invention have an intrinsic viscosity (as measured in methylene chloride at 25° C.) ranging from about 0.30 to about 1.00 dl/g. The dihydric phenols which may be employed to provide such nuclear aromatic compounds, containing as functional groups two hydroxy radicals, each of which is attached directly to a carbon atom of the aromatic nucleus. Typically dihydric phenols include but are not limited to
2,2-bis(4-hydroxyphenyl)propane;
hydroquinone;
resorcinol;
2,2-bis(4-hydroxyphenyl)pentane;
2,4'-(dihydroxyphenyl)methane;
bis-(2-hydroxyphenyl)methane;
bis-(4-hydroxyphenyl)methane;
2,4'-dihydroxynaphthalene;
bis-(4-hydroxyphenyl)sulfone;
bis-(3,5-dimethyl-4-hydroxyphenyl)sulfone;
bis-(3,5-dimethyl-4-hydroxyphenyl)propane;
bis-(3,5-dihalo-4-hydroxyphenyl)propane;
bis-(3,5-dihalo-4-hydroxyphenyl)sulfone;
2,2'-bishydroxyphenylfluorene;
1,1-bis(4-hydroxyphenyl)cyclohexane;
4,4'-dihydroxydiphenylether;
4,4'-dihydroxy-3,3'dihalodiphenylether; and
4,4'-dihydroxy 2,5 dihydroxydiphenylether.

Other dihydric phenols which are also suitable for use in the preparation of the polycarbonates are disclosed in U.S. Pat. Nos. 2,999,835, 3,038,365, 3,334,154 and 4,131,575. Branched polycarbonates are also useful, such as those described in U.S. Pat. No. 3,635,895 and 4,001,184.

These aromatic polycarbonates can be also copolymerized with linear or branched aliphatic $C_5$ to $C_{12}$ diols or diacids or polysiloxanes or linear or aromatic polyesters, otherwise know as polyester-carbonates.

The polycarbonate resins can be prepared from these raw materials by any of several known processes such as the known interfacial, solution or melt processes.

In general, the polycarbonate resin is employed in amounts to maintain the desired physical properties of the resin blend compositions, including their heat resistance and toughness. One or more polycarbonate resins are typically incorporated into the blend of the present invention in amounts of about 10 to 90 weight percent, preferably about 30 to 85 weight percent, more preferably to about 60 to 75 weight percent and most preferably about 64 to 73 weight percent. In cases where more than one polycarbonate resins are incorporated, the ratio of the first polycarbonate to the second polycarbonate may vary from about 10 to 90 to about 90 to 10 weight percent.

Acrylonitrile-butadiene-styrene (ABS) terpolymer of the present invention is well known in the art. ABS is a two-phase system based on a styrene-acrylonitrile (SAN) copolymer continuous phase and a dispersed elastomeric phase typically based on butadiene rubber. Small amounts of styrene and acrylonitrile are grafted onto the rubber particles to compatibilize the two phases.

The styrene-acrylonitrile rigid resin is typically incorporated into the blend of the present invention in amounts of about 5 to 70 weight percent, preferably about 10 to 50 weight percent, more preferably 14 to 30 weight percent of the total rigid resin.

Three major processes which can be used to prepare ABS include emulsion, bulk/mass and suspension polymerization or combinations thereof. The emulsion polymerization of ABS is a two step process involving polymerization of butadiene to form a rubber latex, followed by addition and polymerization of acrylonitrile and styrene during which grafting to the rubber and production of the SAN continuous phase takes place. The rubber content of an ABS graft when made in emulsion may range from 10 to 90 weight percent and the SAN will be grafted from 10 to 90 weight percent of the ABS graft composition. The ratio of the styrene to acrylonitrile ranges from 50:50 to 85:15. When made in emulsion, the rubber latex will have a particle size ranging from about 0.15 to about 0.8 microns by weight, preferable 0.3 microns. Compositionally, the rubber phase may be comprised of polybutadiene, styrene-butadiene or butadiene-acrylonitrile copolymers, polyisoprene, EPM (ethylene/propylene rubbers), EPDM rubbers (ethylene/propylene/diene rubbers containing as diene, a nonconjugated diene such as hexadiene-(1,5) or norbornadiene in small quantities) and crosslinked alkylacrylate rubbers based on $C_1$–$C_8$ alkylacrylates, in particular ethyl, butyl and ethylhexylacrylate. One or more rubber grafted resins from about 10 to 90 and about 90 to 10 weight percent may also be used. The latex emulsion is broken and the ABS is recovered at the end of the polymerization. In the bulk process, the polymerization is carried out in styrene/acrylonitrile monomer rather than in water. Instead of making the rubber, a pre-produced rubber is dissolved in the monomer solution. The rubber-monomer solution is then fed into the reactors and grafting/polymerization is carried out. When produced via a bulk or bulk-suspension process, the soluble rubber will range from 5 to 25 weight percent and the dispersed rubbery phase will have a diameter ranging from about 0.5 microns to about 10 microns. A large weight percent of the free SAN phase is present depending upon the amount of rubber employed.

In place of styrene and acrylonitrile monomers used in the grafted or free rigid resins, monomers such as, alpha methyl styrene, para-methyl styrene, mono, di or tri halo styrene, alkyl methacrylates, alkyl acrylates, maleic anhydride, methacrylonitrile, maleimide, N-alkyl maleimide, N-aryl maleimide or the alkyl or halo substituted N-aryl maleimides may be replaced for the styrene or acrylonitrile or added to. Like the bulk process, suspension polymerization uses rubber dissolved in the monomer solution, but after polymerizing SAN to low conversions, the rubber/SAN/monomer mixture is suspended in water and the polymerization is completed.

It is preferable to use high flow SAN in this invention. High flow SAN are SAN with weight average molecular weights ranging from about 30,000 to about 75,000, preferably from about 45,000 to about 72,000, more preferably from about 50,000 to about 66,000, and most preferably from about 55,000 to about 64,000, and polydispersity of $Mn/Mw \approx 2-5$.

However, when case bulk/mass ABS is used in the PC/ABS blend, the molecular weight distribution of SAN can be higher with polydispersity of $Mn/Mw = 2-8$. The weight average molecular weight could vary from 72,000 to 130,000, where the number average molecular weight could vary from 15,000 to 42,000.

One preferred composition comprises aromatic polycarbonate resin present at a level of from 50% to 100% by weight based on the total weight of the thermoplastic resin composition more preferably from 60% to 80% by weight thereof, and most preferably from 65% to 75% by weight thereof, and further preferably contains a rubber modified vinyl aromatic graft copolymer present at a level of from 0% to 50% by weight based on the total weight of thermoplastic resin composition more preferably from 20% to 40% by weight thereof, and most preferably from 25% to 35% by weight thereof and further contains the polyolefin nucleating agent.

The poly(phenylene ether)-based materials are sometimes referred to as "poly(phenylene oxides)". They are well-known in the art and described in many references, such as *Organic Polymer Chemistry*, by K. J. Saunders, Chapman and Hall, 1973; and U.S. Pat. Nos. 4,970,272; 4,957,966; 4,956,497; 4,956,422; 4,826,919; 4,684,696; 4,097,550; 3,306,875; and 3,306,874, all of which are incorporated herein by reference. Most often, the poly(phenylene ether) resins (hereinafter referred to as "PPE") will comprise units derived from 2,6-dimethyl phenol, or a combination of units derived from 2,6-dimethylphenol and 2,3,6-trimethyl phenol.

The PPE may be utilized alone or in combination with alkenyl aromatic resins such as polystyrene—especially the rubber-modified polystyrenes (HIPS) described above. The weight ratio of PPE to alkenyl aromatic component could range from about 95:5 to about 5:95. Commercial examples of PPE /polystyrene blends include the NORYL® resin products, available from GE Plastics. The blends can contain a wide variety of other components, in amounts effective for an intended purpose. Non-limiting examples include flame retardants, modifier resins such as the styrene/butadiene block copolymers discussed above; fillers, reinforcing agents, pigments, other colorants, various stabilizers, and plasticizers. Techniques for blending the various components and molding the polyphenylene ether product are also well-known in the art and described in some of the references cited above.

Injection molding processes for producing thermoplastic structural foam may be achieved by either introducing an inert gas directly into the melted thermoplastic composition or by preblending the thermoplastic resin with a chemical blowing agent which, when heated during processing, releases inert gas that disburses through the polymer melt. When the gas/resin mixture is shot under pressure into the mold cavity, the gas expands within the plasticized material as it fills a mold, producing an internal cellular structure as well as a tough external skin at the mold surface. Large part molding capabilities of the injection molding structural foam process can be achieved at low mold pressures by the self expanding character of the plasticized material.

Structural foam molding processes involve combining molten thermoplastic with a blowing agent in the melt, which is stored under pressure and is injected into the mold cavity for expansion of the compressed gases within the polymer melt creates the cellular structures and maintains internal pressure on the external skin during cooling and reducing sink marks. There are different types of foam processing methods which are identified as high pressure and low pressure processes. Low pressure processes employ both a physical blowing agent, most commonly nitrogen and chemical blowing agents, while high pressure processes generally employ only chemical blowing agents.

In low pressure processing methods for structural foam, a metered volume of plastic resin with blowing agent, which is less than the volume of the mold cavity, is injected into the mold. At this point, the gas-polymer mixture expands and fills the mold cavity. The portion of this mass that contacts the mold surface forms a skin layer while the interior of the mass forms a cellular core. Since the mold cavity is not completely filled during injection, the high pressures of injection cannot be transmitted into the mold, and the average cavity pressure is typically under 500 pounds per square inch (PSI).

The low pressure results in parts with very low molded in stresses and this in turn results in virtual elimination of warp. These factors contribute to the success of low pressure processes in the molding of large intricate parts.

Low pressure processing with nitrogen or other inert gases can be achieved by using an extruder which mixes and then meters the gas containing polymer melt into a holding container called an accumulator where the melt is held under pressure to prevent premature expansion. When the predetermined shot size attained in the accumulator, a valve opens and a plunger forces the melt into the mold, only partially filling it. The thermoplastic resin melt is then expanded in the mold cavity by the compressed gases.

Low pressure processing with chemical blowing agents is achieved by mixing the blowing agents with the plastic pellets or plastic particles and then introducing the molten mixture into the molding machine. During processing the blowing agent is exposed to sufficient heat to cause it to decompose thus giving off the gases necessary to achieve the foaming process. Chemical blowing agents typically decompose within narrow temperature ranges which must be matched to the processing temperatures of the resin for which they are to be used. The equipment used for low pressure structural foaming processes with chemical blowing agents is very similar to that used for injection molding processes using nitrogen gases. High pressure structural foaming processes are characterized not only by the high cavity pressures employed, typically 2,000 to 20,000 PSI, but also by the volume of material injected into the mold in the system, sufficient material to completely fill the mold is injected under injection molding pressures. The mold cavity volume is then increased by controlled opening of the platens, core or slide activators, or by combination of these actions to allow the foaming actions to occur. These foaming processes are all well known in the art.

The thermoplastic resin compositions of the present invention comprise a foamable thermoplastic resin and a polyolefin nucleating agent present in an amount effective to enhance the uniformity of the cell structures formed during expansion of the thermoplastic composition during injection molding foaming processes. Preferably the nucleating agent is present at a level of from about 0.1% to about 5% by weight based on the total weight of said thermoplastic resin composition, more preferably at a level of from about 1% to about 3% by weight thereof, even more preferably present at a level of about 0.5% to about 2% by weight thereof, and most preferably present at a level of about 0.5% to about 1.5% by weight thereof.

The thermoplastic resin composition may also contain at least one plasticizer and/or flame retardant. Such organic phosphates, organic diphosphates, organic polyphosphates, and halogen containing organic compounds such as brominated organic compounds. The composition may contain from 0.5% to 4.0% by weight pigments, such as titanium dioxide, based on the total weight of the composition.

The polyolefin nucleating agent may be incorporated into the composition by several methods. In one preferred embodiment, the polyolefin resin is added with the other ingredients during the compounding step to produce the final composition. In another preferred embodiment, the polyolefin is made into a masterbatch by first precompounding the polyolefin nucleating agent with an amount of at least one thermoplastic resin to form a concentrate comprising from 0.5 to 50 percent by weight polyolefin resin based on the total weight of the concentrate, and then compounding the concentrate with the remaining thermoplastic resins to make the final composition.

The thermoplastic compositions may contain amounts of fillers, for example glass fibers, glass beads, mica, carbon fibers, talc, calcium carbonate, metal flakes, metal fibers. The thermoplastic composition may be either plasticized or nonplasticized.

As mentioned above, prior injection molding foaming processes involving thermoplastic materials containing traditional nucleating agents such as clay at about 0.5 parts per weight have provided problems with respect to inability to uniformly expand the thermoplastic material and foam injection molding processes.

We have found that the addition of polyolefin to thermoplastic compositions which are then foam injection molded results in the polyolefin acting as a nucleating agent to generate cells which grow to produce the final foam structure during the injection molding process leading to better structural foam cell uniformity.

EXAMPLES

Table 1 illustrates the improved cell uniformity obtained by using the polyolefin nucleating agents.

The following examples illustrate the effectiveness of the polyolefin nucleating agent to form more uniform cell structures.

A base composition containing 42% by weight PPE and 58% by weight HIPS were foam injection molded using 4% of a chemical blowing agent concentrate to attain a either a 7 or 14% weight reduction (Table 1). A comparison was made using PTFE as a nucleating agent versus using low density polyethylene as a nucleating agent. The blowing agent concentrates are as follows:

| Concentrate    | C-1  | C-2 | C-3 |
|----------------|------|-----|-----|
| HIPS           | 82   | 82  | 82  |
| mineral oil    | 5    | 5   | 5   |
| blowing agent  | 7.5  | 10  | 10  |
| PTFE           | 0.06 | 0   | 0   |
| PE             | 0    | 10  | 0   |

The addition of both nucleating agents to the thermoplastic resin improved the cell structure uniformity of the foamed article relative to that of foamed articles from neat thermoplastic resin foamed. The chemical blowing agent was a chemical blowing agent concentrate containing 3,6-dihydro-5-phenyl-2H-1,3,4-oxadiazin-2-one. The chemical blowing agent will decompose at molding temperatures (>200° C.) producing nitrogen, carbon dioxide and other decomposition gases that form the individual cells in molded parts.

Optical micro graphs illustrated the improved cell structure in terms of size, uniformity and distribution. The specimens were fractured cryogenically, and optical micro graphs were taken of the fracture surface at a magnification of 8×.

TABLE 1

| | Cell Uniformity of Foamed Resin | | | | | |
|---|---|---|---|---|---|---|
| | 1 | 2 | 3 | 4 | 5 | 6 |
| blowing agent conc. | C-1 | C-1 | C-2 | C-2 | C-3 | C-3 |
| nucleating agent | PTFE | PTFE | PE | PE | none | none |
| % density reduction | 7 | 14 | 7 | 14 | 7 | 14 |
| Yield strength (psi) | 5190 | 5130 | 5320 | 5025 | 6047 | 4863 |
| Break strength (psi) | 5540 | 5130 | 5740 | 5025 | 6047 | 4863 |
| Break elongation (%) | 38 | 23 | 40 | 18 | 20 | 11 |

TABLE 1-continued

| Cell Uniformity of Foamed Resin | | | | | | |
|---|---|---|---|---|---|---|
| | 1 | 2 | 3 | 4 | 5 | 6 |
| Flexural strength (psi) | 10490 | 9530 | 10670 | 9599 | 10680 | 8643 |
| Flexural modulus (kpsi) | 307 | 283 | 308 | 283 | 327 | 275 |
| n. Izod (ft-lb/in) | 3.59 | 3.55 | 3.77 | 3.45 | 2.65 | 2.41 |
| HDT @ 264 psi (° F.) | 226 | 222 | 231 | 223 | 245 | 235 |
| Uniformity of cells | good | good | good | good | poor | poor |

The foamed articles of Table 1 were examined by optical microscopy after foaming to determine the effect that polyolefin nucleating agent had on cell structure when it is added to the blend.

A marked improvement can be seen in the foamed samples made with the polyolefin as the nucleating agent where a smaller and tighter cell structure can be seen. Unexpectedly, samples 3 and 4 containing the polyolefin as a nucleating agent has very similar cell size and uniformity as samples 1 and 2 containing PTFE as a nucleating agent. Samples 5 and 6 that did not contain a nucleating agent and each exhibits large cell sizes that were not uniform. The large cell size and lack of uniformity results in large variability and unpredictability in physical properties, especially impact strength and elongation, and have diminished commercial utility.

What is claimed is:

1. A process for producing structural thermoplastic foam articles, said process comprising gas expansion of a melted thermoplastic resin composition comprising at least one foamable thermoplastic resin and an amount of a polyolefin nucleating agent effective to enhance the cell structure uniformity of the structural foam.

2. The process of claim 1, wherein said polyolefin nucleating agent is present at a level of from about 0.1 percent to about 5 percent by weight based on the total weight of the composition.

3. The process of claim 1, wherein said foamable thermoplastic resin is selected from the group consisting of aromatic polycarbonate resins, blends of aromatic polycarbonate resins with rubber modified vinyl aromatic graft copolymers, and blends of poly(phenylene ether) resins with polystyrene resins.

4. The process of claim 1, wherein said polyolefin nucleating agent is at least one member of the group consisting of low density polyethylene, linear low density polyethylene, high density polyethylene, medium density polyethylene, and copolymers of ethylene and organic esters.

5. The process of claim 3, wherein said rubber modified vinyl aromatic graft copolymers are acrylonitrile-butadiene-styrene graft copolymers.

6. The process of claim 1, wherein said thermoplastic resin consists essentially of aromatic polycarbonate resins, blends of aromatic polycarbonate resins with rubber modified vinyl aromatic graft copolymers, and blends of poly (phenylene ether) resins with polystyrene resins.

7. The process of claim 2, wherein said resin composition further contains a plasticizer.

8. The process of claim 1, wherein said composition is formed by precompounding said nucleating agent with the amount of thermoplastic resin to form a concentrate comprising from 5 to 50 percent by weight polyolefin resin based on the total weight of the concentrate, and then compounding said concentrate with the remainder of said thermoplastic resin to make said composition.

9. The process of claim 1, wherein said gas expansion is achieved by thermal decomposition of a chemical blowing agent present in said composition.

10. The process of claim 1, wherein the resin composition further contains a flame retardant.

11. A process for producing structural thermoplastic foam, said process consisting essentially of gas expansion of a melt thermoplastic resin composition and an amount of a polyethylene nucleating agent effective to improve the cell structure uniformity of the resultant structural foam.

* * * * *

(12) REEXAMINATION CERTIFICATE (4663rd)
United States Patent
Adedeji

(10) Number: US 6,113,822 C1
(45) Certificate Issued: Oct. 29, 2002

(54) POLYOLEFINS AS NUCLEATING AGENT FOR FOAMED ENGINEERING POLYMERS

(75) Inventor: Adeyinka Adedeji, Albany, NY (US)

(73) Assignee: General Electric Company, Schenectady, NY (US)

Reexamination Request:
No. 90/006,190, Jan. 14, 2002

Reexamination Certificate for:
Patent No.: 6,113,822
Issued: Sep. 5, 2000
Appl. No.: 09/220,565
Filed: Dec. 23, 1998

(21) Appl. No.: 09/220,565

(51) Int. Cl.⁷ .............................. C08J 9/00; B29B 7/00
(52) U.S. Cl. ................... 264/48; 264/328.1; 264/328.4; 521/79; 521/81; 521/134; 521/138; 521/139
(58) Field of Search .................. 264/48, 328.1, 264/328.4; 521/79, 81, 134, 138, 139

(56) References Cited

U.S. PATENT DOCUMENTS

| | | |
|---|---|---|
| 4,166,055 A | 8/1979 | Lee, Jr. |
| 4,228,046 A | 10/1980 | Lee, Jr. |
| 4,239,673 A | 12/1980 | Lee, Jr. |
| 4,242,263 A | 12/1980 | Lee, Jr. |
| 4,315,084 A | 2/1982 | Cooper et al. ................ 525/69 |
| 4,332,714 A | 6/1982 | Haaf et al. ................... 524/141 |
| 4,383,082 A | 5/1983 | Lee, Jr. ....................... 525/92 |
| 4,410,651 A | 10/1983 | Haaf et al. ................... 524/127 |
| 4,535,106 A | 8/1985 | Abolins et al. ............. 524/151 |
| 4,584,334 A | 4/1986 | Lee, Jr. et al. .............. 524/151 |
| 5,314,925 A | 5/1994 | Burnell et al. ............... 521/92 |
| 5,369,135 A | 11/1994 | Campbell et al. ........... 521/134 |
| 5,411,687 A | 5/1995 | Imeokparia et al. .......... 264/50 |
| 5,434,195 A | 7/1995 | Imeokparia et al. ........ 521/146 |
| 5,618,853 A | 4/1997 | Vonken et al. ............... 521/60 |
| 5,650,106 A | 7/1997 | Paquet et al. ................ 264/53 |
| 5,693,687 A | 12/1997 | Imeokparia et al. ........ 521/146 |
| 5,824,710 A | 10/1998 | Imeokparia et al. .......... 521/79 |

FOREIGN PATENT DOCUMENTS

| | | |
|---|---|---|
| GB | 1443549 | 12/1973 |
| GB | 1 557 980 | 11/1976 |

*Primary Examiner*—Nathan M. Nutter

(57) ABSTRACT

A process for producing structural thermoplastic foam is provided which involves gas expansion of a melted thermoplastic resin composition containing an amount of a polyolefin resin effective as a nucleating agent. The thermoplastic resin compositions provided exhibit an improved uniformity of cell structure in the resultant structural thermoplastic foam as a result of the incorporation of the polyolefin nucleating agent. The process and compositions are useful in the production of structural thermoplastic foam articles.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3 and 6 are cancelled.

Claims 1, 5 and 11 are determined to be patentable as amended.

Claims 2, 4 and 7–10, dependent on an amended claim, are determined to be patentable.

1. A process for producing structural thermoplastic foam articles, said process comprising gas expansion of a melted thermoplastic resin composition comprising at least one foamable thermoplastic resin *selected from the group consisting of blends of aromatic polycarbonate resins with rubber modified vinyl aromatic graft copolymers and blends of poly(phenylene ether) resins with polystyrene resins* and an amount of a *non-elastomeric* polyolefin nucleating agent effective to enhance the cell structure uniformity of the structural foam.

5. The process of claim [3]*1*, wherein said rubber modified vinyl aromatic graft copolymers are acrylonitrile-butadiene-styrene graft copolymers.

11. A process for producing structural thermoplastic foam, said process consisting essentially of gas expansion of a melt thermoplastic resin composition *selected from the group consisting of blends of aromatic polycarbonate with rubber modified vinyl aromatic graft copolymers and blends of poly(phenylene ether) resins with polystyrene resins* and an amount of a *non-elastomeric* polyethylene nucleating agent effective to improve the cell structure uniformity of the resultant structural foam.

* * * * *